US010341987B2

(12) United States Patent
Kanbe

(10) Patent No.: US 10,341,987 B2
(45) Date of Patent: Jul. 2, 2019

(54) MOBILE ELECTRONIC DEVICE, CONTROL METHOD, AND NON-TRANSITORY STORAGE MEDIUM

(71) Applicant: KYOCERA Corporation, Kyoto-shi, Kyoto (JP)

(72) Inventor: Masaki Kanbe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/938,007

(22) Filed: Mar. 28, 2018

(65) Prior Publication Data

US 2018/0288733 A1    Oct. 4, 2018

(30) Foreign Application Priority Data

Mar. 29, 2017    (JP) .................................. 2017-065883

(51) Int. Cl.
| | |
|---|---|
| *H04M 1/00* | (2006.01) |
| *H04B 1/38* | (2015.01) |
| *H04W 68/00* | (2009.01) |
| *H04M 1/02* | (2006.01) |
| *H04M 1/725* | (2006.01) |

(52) U.S. Cl.
CPC ....... *H04W 68/005* (2013.01); *H04M 1/0202* (2013.01); *H04M 1/0266* (2013.01); *H04M 1/72519* (2013.01); *H04M 2201/38* (2013.01); *H04M 2250/16* (2013.01); *H04M 2250/22* (2013.01); *Y02D 70/00* (2018.01); *Y02D 70/1262* (2018.01); *Y02D 70/142* (2018.01); *Y02D 70/144* (2018.01);

(Continued)

(58) Field of Classification Search
CPC ........ H04B 1/3888; H04B 7/26; H04B 17/23; H04M 1/72519; H04M 1/72552; G09G 3/36; G09G 5/003; G09G 5/005; G09G 2300/023; G09G 2320/08; G09G 2330/021; G09G 2360/04; G09G 2360/144
USPC ................ 455/412.1, 412.2, 412.3, 566, 574
See application file for complete search history.

(56) References Cited

U.S. PATENT DOCUMENTS

| | | | | |
|---|---|---|---|---|
| 7,330,178 B2* | 2/2008 | Yorio | ................ | G06F 1/1616 345/156 |
| 8,326,368 B2* | 12/2012 | Sawada | ............... | H04M 1/0245 455/566 |

(Continued)

FOREIGN PATENT DOCUMENTS

WO    2014/175455 A1    10/2014

*Primary Examiner* — Quochien B Vuong
(74) *Attorney, Agent, or Firm* — Hauptman Ham, LLP

(57) ABSTRACT

There is provided a mobile electronic device including a first display, a second display overlaid on the first display and switchable between a transmissive state in which incident light is allowed to be transmitted and a reflective state in which incident light is allowed to be reflected, a storage configured to store therein a notification method determining condition for determining whether to provide notification of an interrupt event by using the first display or provide the notification of the interrupt event by using the second display, and at least one controller configured to, upon occurrence of the interrupt event, provide the notification of the interrupt event by using the first display or provide the notification of the interrupt event by using the second display, according to the notification method determining condition.

7 Claims, 12 Drawing Sheets

(52) U.S. Cl.
CPC .......... *Y02D 70/146* (2018.01); *Y02D 70/162* (2018.01); *Y02D 70/164* (2018.01); *Y02D 70/166* (2018.01)

(56) References Cited

U.S. PATENT DOCUMENTS

| | | | | |
|---|---|---|---|---|
| 8,369,899 B2* | 2/2013 | Hasegawa | ............... | G06F 21/32 455/566 |
| 8,437,806 B2* | 5/2013 | Kim | ............... | G06F 3/1423 455/566 |
| 8,798,684 B2* | 8/2014 | Lee | ............... | H04M 1/27455 455/418 |
| 8,994,653 B2* | 3/2015 | Gardenfors | ............... | G06F 1/1626 455/566 |
| 2011/0143769 A1* | 6/2011 | Jones | ............... | G06F 1/1624 455/566 |
| 2011/0148832 A1* | 6/2011 | Nie | ............... | G09G 3/3648 345/207 |
| 2014/0198016 A1* | 7/2014 | Hunt | ............... | G09G 3/36 345/5 |

* cited by examiner

FIG.6

| FIRST DISPLAY (SCREEN IS ON) | RESPONSE CONDITION 1 | |
|---|---|---|
| | INCOMING CALL / RECEPTION OF ELECTRONIC MAIL | OTHER THAN INCOMING CALL / RECEPTION OF ELECTRONIC MAIL |
| | REFER TO RESPONSE CONDITION 2 | USE SECOND DISPLAY |
| FIRST DISPLAY (SCREEN IS OFF) | USE SECOND DISPLAY | |

FIG.7

| RESPONSE CONDITION 2 | |
|---|---|
| REGISTERED IN ADDRESS BOOK | USE FIRST DISPLAY |
| UNREGISTERED IN ADDRESS BOOK | USE SECOND DISPLAY |

FIG.15

| RESPONSE CONDITION 3 | | |
|---|---|---|
| SECOND DISPLAY (SCREEN IS ON) | INCOMING CALL / RECEPTION OF ELECTRONIC MAIL | OTHER THAN INCOMING CALL / RECEPTION OF ELECTRONIC MAIL |
| | REFER TO RESPONSE CONDITION 4 | USE SECOND DISPLAY |
| SECOND DISPLAY (SCREEN IS OFF) | USE FIRST DISPLAY | |

FIG.16

| RESPONSE CONDITION 4 | |
|---|---|
| REGISTERED IN ADDRESS BOOK | USE FIRST DISPLAY |
| UNREGISTERED IN ADDRESS BOOK | USE SECOND DISPLAY |

MOBILE ELECTRONIC DEVICE, CONTROL METHOD, AND NON-TRANSITORY STORAGE MEDIUM

CROSS-REFERENCE TO RELATED APPLICATION

The present application claims priority to and incorporates by reference the entire contents of Japanese Patent Application No. 2017-065883 filed in Japan on Mar. 29, 2017.

FIELD

The present application relates to a mobile electronic device, a control method, and a non-transitory storage medium.

BACKGROUND

Conventional liquid crystal displays mounted in mobile electronic devices, such as mobile phones and smartphones, implement display of a visible image by using a light source, such as a backlight.

In the above-mentioned mobile electronic devices, when an interrupt such as an incoming call or a reception of an electronic mail occurs, a display module is turned on to produce a display for notifying a user of the interrupt. However, even when the interrupt is not necessary or less important for a user, the occurrence of the interrupt uniformly causes the display module to be turned on to produce the display. Hence, there is a problem in which the mobile electronic devices wastefully consume electric power.

SUMMARY

A mobile electronic device, a control method, and a non-transitory storage medium are disclosed.

According to one aspect, there is provided a mobile electronic device including a first display, a second display overlaid on the first display and switchable between a transmissive state in which incident light is allowed to be transmitted and a reflective state in which incident light is allowed to be reflected, a storage configured to store therein a notification method determining condition for determining whether to provide notification of an interrupt event by using the first display or provide the notification of the interrupt event by using the second display, and at least one controller configured to, upon occurrence of the interrupt event, provide the notification of the interrupt event by using the first display or provide the notification of the interrupt event by using the second display, according to the notification method determining condition.

According to one aspect, there is provided a control method executed by a mobile electronic device, the mobile electronic device comprising a first display, a second display overlaid on the first display and switchable between a transmissive state in which incident light is allowed to be transmitted and a reflective state in which incident light is allowed to be reflected, and a storage configured to store therein a notification method determining condition for determining whether to provide notification of an interrupt event by using the first display or provide the notification of the interrupt event by using the second display, wherein the control method comprises, upon occurrence of the interrupt event, providing the notification of the interrupt event by using the first display or providing the notification of the interrupt event by using the second display, according to the notification method determining condition.

According to one aspect, there is provided a non-transitory storage medium that stores therein a control program that causes a mobile electronic device to execute providing notification of an interrupt event, the mobile electronic device comprising a first display, a second display overlaid on the first display and switchable between a transmissive state in which incident light is allowed to be transmitted and a reflective state in which incident light is allowed to be reflected, and a storage configured to store therein a notification method determining condition for determining whether to provide the notification of the interrupt event by using the first display or provide the notification of the interrupt event by using the second display, wherein the control program comprises, upon occurrence of the interrupt event, providing the notification of the interrupt event by using the first display or providing the notification of the interrupt event by using the second display, according to the notification method determining condition.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 6 is a diagram illustrating an example of a notification method determining condition according to the embodiments;

FIG. 7 is a diagram illustrating an example of a notification determining condition according to the embodiments;

FIG. 15 is a diagram illustrating an example of a notification determining condition according to the other embodiments;

FIG. 16 is a diagram illustrating an example of a notification determining condition according to the other embodiments.

DETAILED DESCRIPTION OF THE PREFERRED EMBODIMENTS

Figure 1:
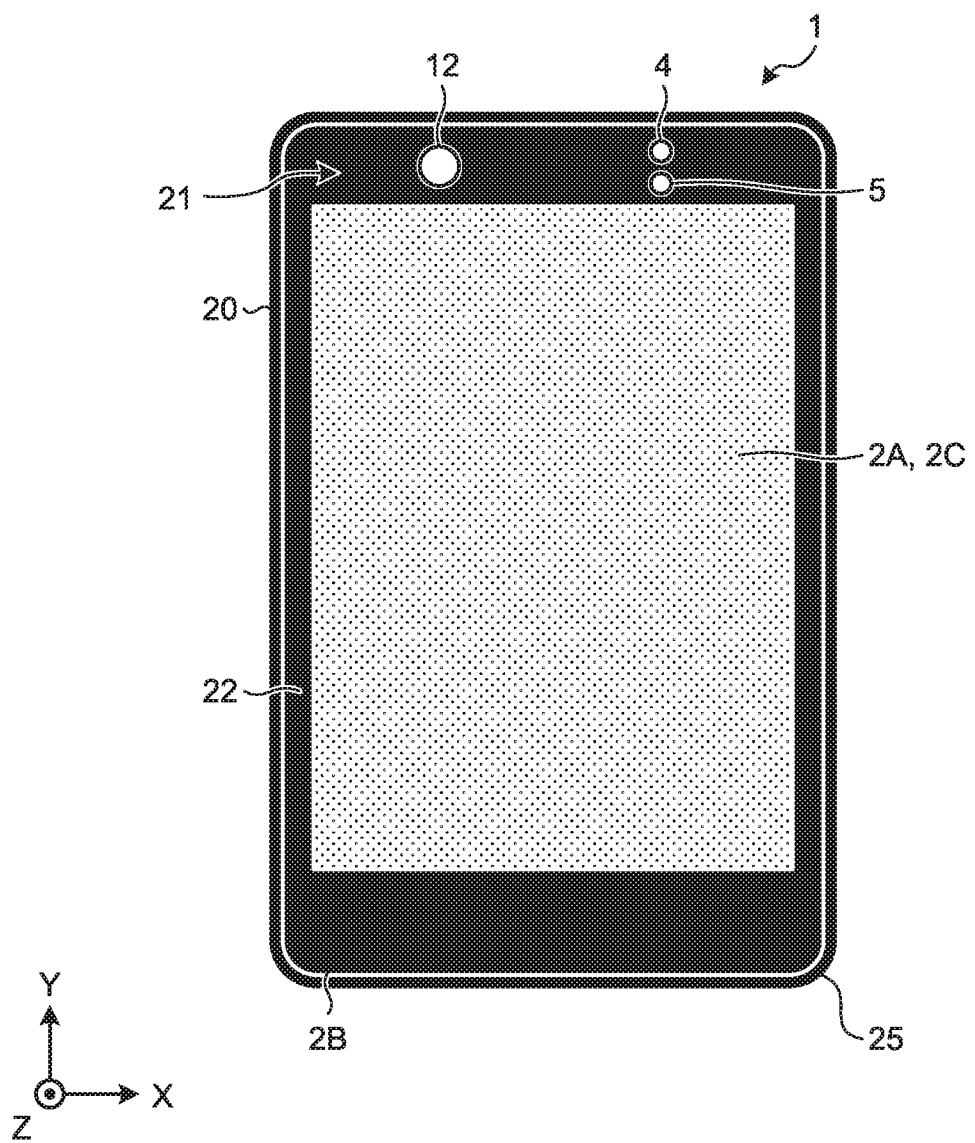
FIG. 1 is a front view of a smartphone according to embodiments.

A plurality of embodiments according to the present application is described in detail with reference to the drawings. Hereinafter, a smartphone is described as an example of an electronic device according to the present application. In the following description, the same reference signs may denote the same constituent components. Furthermore, overlapped description of the constituent components may be omitted. Furthermore, for the convenience of description, reference signs may be omitted in the drawings.

Figure 2:
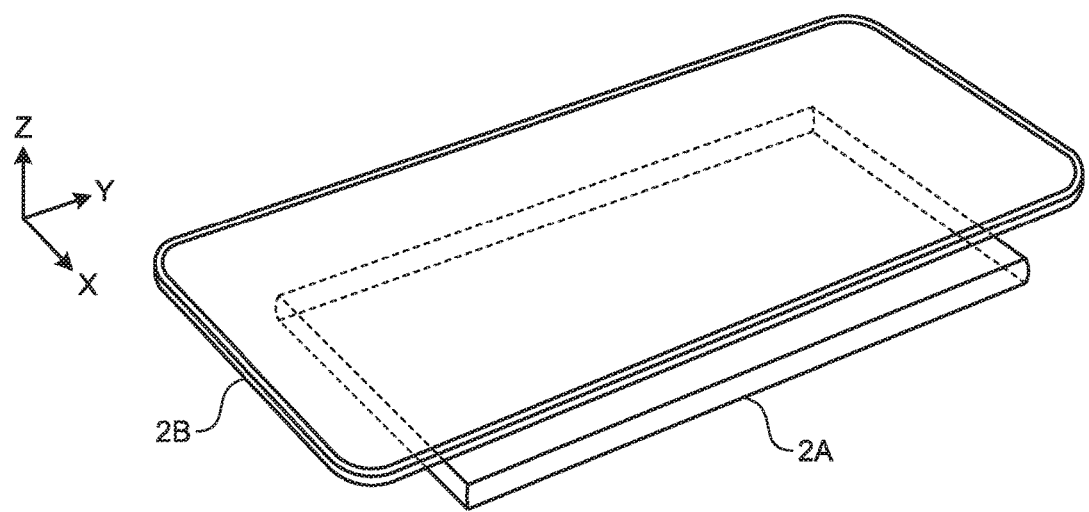
FIG. 2 is a perspective view illustrating a positional relation between a first display and a second display of the smartphone according to the embodiments.

With reference to FIG. 1 and FIG. 2, an example of an appearance configuration of a smartphone 1 according to the embodiments is described. FIG. 1 is a front view illustrating the smartphone according to the embodiments. FIG. 2 is a perspective view illustrating a positional relation between a first display and a second display of the smartphone according to the embodiments.

As illustrated in FIG. 1, the smartphone 1 includes a housing 20. The housing 20 has a front face 21. The front face 21 is a front face (display face) of the smartphone 1. The smartphone 1 includes, on the front face 21, a first display 2A, a second display 2B, a touch screen 2C, a illuminance sensor 4, a proximity sensor 5, and a camera 12.

The first display 2A has an approximately rectangular shape along periphery of the front face 21. The first display 2A is surrounded by a front panel 22 of the housing 20 on the front face 21. The first display 2A has an approximately rectangular shape, but may have any shape, such as a square shape or a round shape. In the example illustrated in FIG. 1, the touch screen 2C may be positioned in such a manner as to overlap the first display 2A. The touch screen 2C may be positioned in parallel to or away from the first display 2A, for example. In the example illustrated in FIG. 1, the touch screen 2C may be along long sides of the first display 2A (a direction of Y coordinate axis) as well as along short sides of the first display 2A (a direction of X coordinate axis). In the case where the touch screen 2C and the first display 2A are positioned in such a manner as to overlap each other, for example, one or a plurality of the sides of the first display 2A may not be along any side of the touch screen 2C.

In like manner with the first display 2A, the second display 2B has an approximately rectangular shape along the periphery of the front face 21. As illustrated in FIG. 2, the second display 2B is positioned in such a manner as to overlap and cover an entirety of surfaces of the first display 2A and the front panel 22 from the display face side of the first display 2A (from a direction of Z axis). The second display 2B has a display face larger than the display face of the first display 2A. The front face 21 is covered with a tempered glass 25, for example. The front face 21 is configured by laminating the first display 2A, the front panel 22, the second display 2B, and the tempered glass 25 in this order in a positive direction of the Z axis. For example, the first display 2A, the second display 2B, and the tempered glass 25 may be bonded together with a photo-curing resin or an adhesive to be laminated.

Figure 3:
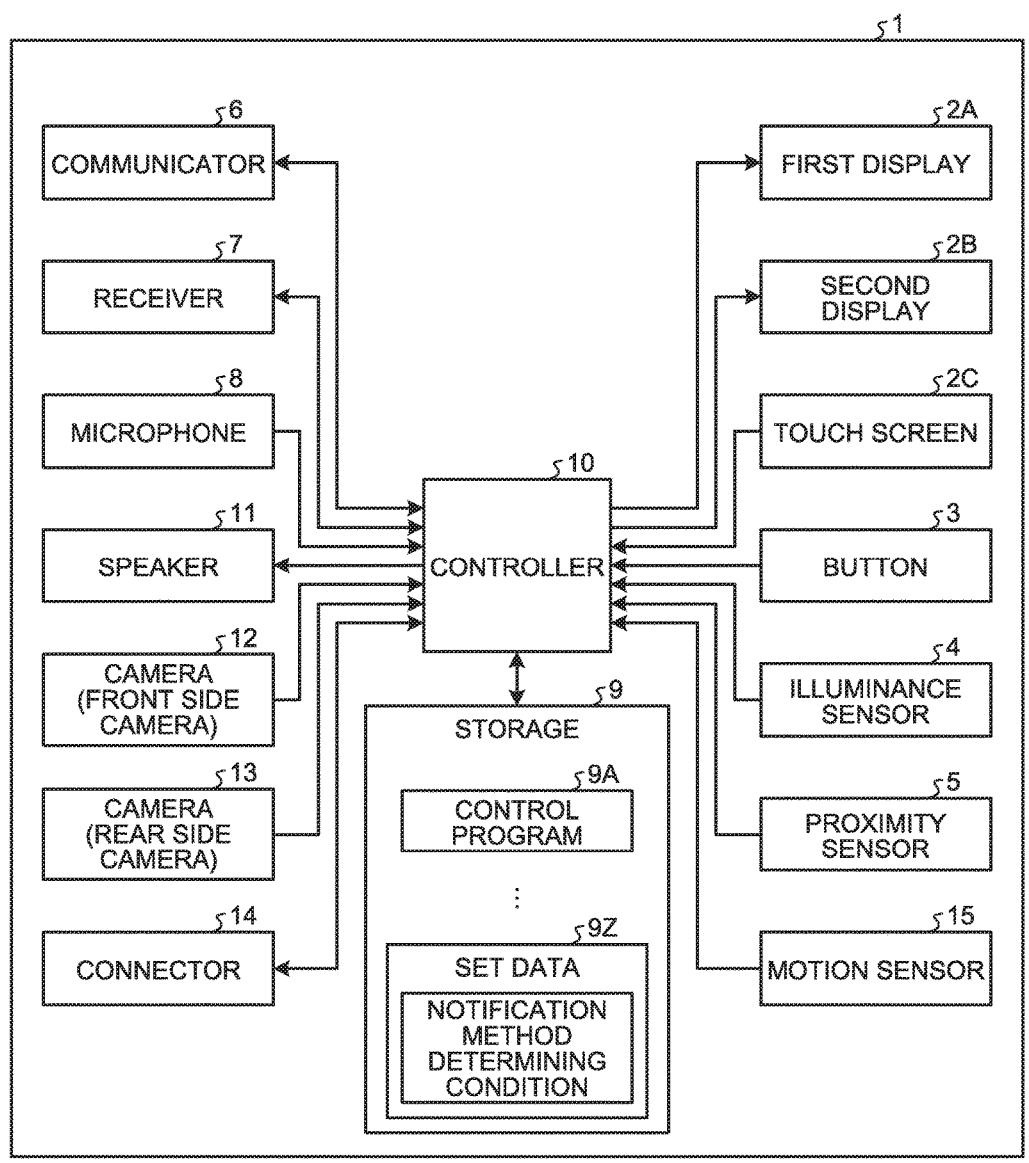
FIG. 3 is a block diagram illustrating a functional configuration example of the smartphone according to the embodiments.

With reference to FIG. 3, a functional configuration example of the smartphone 1 according to the embodiments is described. FIG. 3 is a block diagram illustrating a functional configuration example of the smartphone according to the embodiments.

As illustrated in FIG. 3, the smartphone 1 includes the first display 2A, the second display 2B, the touch screen 2C, a button 3, the illuminance sensor 4, the proximity sensor 5, a communicator 6, a receiver 7, a microphone 8, a storage 9, a controller 10, a speaker 11, the camera 12, a camera 13, a connector 14, and a motion sensor 15. In the following description, the smartphone 1 may be sometimes expressed as "the device".

Examples of the first display 2A include display devices, such as a liquid crystal display (LCD), an organic electroluminescence display (OELD), and an inorganic electroluminescence display (IELD). The first display 2A displays objects, such as a character, an image, a sign, and a figure, on a screen. Examples of the screen on which such an object is displayed by the first display 2A includes a screen called a lock screen, a screen called a home screen, and an application screen displayed during execution of an application. The home screen may be called a desktop, a standby screen, an idle screen, a standard screen, an application list screen, or a launcher screen. A case in which the first display 2A is a conventional liquid crystal display having a backlight is described.

Examples of the second display 2B include a display device that makes use of a polymer network liquid crystal (PNLC) in which a network structure constituted of a polymer, that is, a polymer network is formed in a liquid crystal layer. In the following embodiments, a case in which the second display 2B is a polymer network liquid crystal display is described.

The second display 2B is switchable between a transmissive state in which incident light is allowed to be transmitted and a reflective state in which incident light is allowed to be reflected, by applying a voltage to change arranging direction of liquid crystal molecules. The second display 2B is capable of producing a predetermined image display by appropriately switching between the transmissive state and the reflective state. Instead of using a light source like a backlight, the second display 2B has a configuration for reflecting the surrounding light, and thus, is capable of producing an image display at a brightness level corresponding to an amount of the surrounding light.

Figure 4:
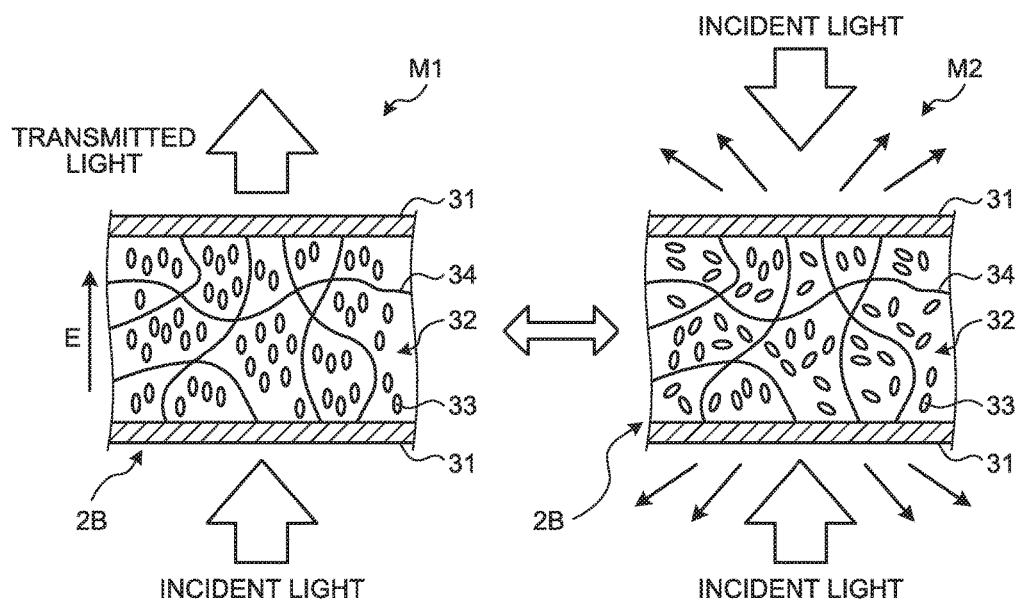
FIG. 4 is a schematic diagram illustrating an example of a display principle of the second display according to the embodiments.
Figure 5:
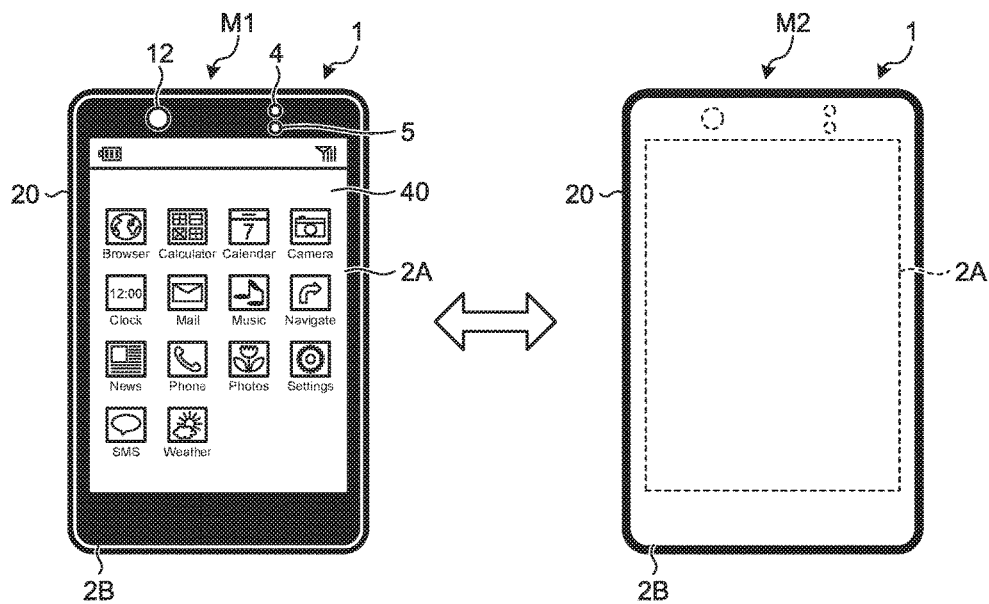
FIG. 5 is a diagram illustrating an example of a display mode according to the embodiments.

Using FIG. 4 and FIG. 5, a display principle of the second display according to the embodiments and a display mode according to the embodiments are described. FIG. 4 is a schematic diagram illustrating an example of a display principle of the second display according to the embodiments. FIG. 5 is a diagram illustrating an example of a display mode according to the embodiments. In the example illustrated in FIG. 4, a crystal structure of the second display 2B is mainly illustrated, while illustration of others, such as a substrate, a circuit, and wiring, is omitted.

As illustrated in FIG. 4, the second display 2B includes a substrate 31 formed of glass or a transparent film (made from an organic material, for example) and a liquid crystal layer 32. The liquid crystal layer 32 includes liquid crystal molecules 33 and a polymer network 34.

A transmissive state M1 is a state in which the liquid crystal molecules 33 in the liquid crystal layer 32 are arranged in an electric field direction E by application of a voltage. In the transmissive state M1, light incident from outside penetrates the liquid crystal layer 32 without being reflected and scattered in the liquid crystal layer 32. In the transmissive state M1, the second display 2B exhibits a transparent state. As illustrated in FIG. 5, when an entirety of a display area of the second display 2B is in the transmissive state M1, a user can see the first display 2A positioned behind the second display 2B, a home screen 40 displayed in the first display 2A, the illuminance sensor 4, the camera 12, and the front panel 22, through the entirety of the display area of the second display 2B in the transmissive state. When part of the display area of the second display 2B is in the transmissive state M1, a user can see part of the first display 2A, the front panel 22, and other constituent components behind second display 2B, through the part of the display area of the second display 2B in the transmissive state.

A reflective state M2 is a state in which, while a voltage is not applied, the liquid crystal molecules 33 are irregularly arranged by action of the polymer network 34 in a three-dimensional-mesh state stretched over inside of the liquid crystal layer 32. In the reflective state M2, light incident from outside is reflected and scattered in the liquid crystal layer 32. In the reflective state M2, the second display 2B exhibits a cloudy state (an opaque state). As illustrated in FIG. 5, when the entirety of the display area of the second display 2B is in the reflective state M2, a user can visually recognize a state in which the entirety of the display area of the second display 2B is cloudy. On the other hand, when the entirety of the display area of the second display 2B is in the reflective state M2, a user cannot visually recognize, for example, the first display 2A positioned behind the second display 2B, depending on a degree of cloudiness (transparency) of the second display 2B. When part of the display area of the second display 2B is in the reflective state M2, a user can visually recognize a state in which the part of the display area of the second display 2B is cloudy. In the description above, the case in which the second display 2B becomes transparent through the application of a voltage is exemplified, but, a configuration opposite to the above may be employed, that is, the second display 2B may be in the transmissive state M1 while a voltage is not applied, whereas in the reflective state M2 while a voltage is applied. Hereinafter, a case is described in which the second display 2B is in the transmissive state M1 while a voltage is applied to the substrate 31, whereas the second display 2B is in the reflective state M2 while a voltage is not applied to the substrate 31.

The smartphone 1 implements an image display using the second display 2B by switching between the transmissive state M1 and the reflective state M2 in the display area of the second display 2B. When implementing an image display using the second display 2B, the smartphone 1 can adjust the degree of cloudiness (transparency) of the second display 2B so as to make a tone difference easily visually recognizable for a user between a portion in the transmissive state M1 in the display area and a portion in the reflective state M2 in the display area. In the smartphone 1, the second display 2B is configured using a polymer network liquid crystal, whereby costs can be made lower than that in a case in which the second display 2B is configured using electronic paper obtained by making use of metal plating. A polarizing plate for adjusting a vibration direction of light and an orientation film for controlling an orientation direction of the liquid crystal molecules 33 are not required, and therefore, a thinner display than conventional liquid crystal displays can be achieved, and also the costs can be reduced.

The touch screen 2C may be positioned in such a manner as to overlap the first display 2A. The touch screen 2C is capable of detecting a contact with the touch screen 2C or an approach thereto of one or a plurality of fingers, one or a plurality of pens, or one or a plurality of stylus pens (hereinafter, sometimes referred to as a "finger"). The touch screen 2C is capable of detecting a position on the touch screen 2C (hereinafter, referred to as a "contact position") at which one or a plurality of fingers, one or a plurality of pens, or one or a plurality of stylus pens comes into contact with or comes closer to the touch screen 2C. The touch screen 2C is capable of informing the controller 10 about contact of the finger with the touch screen 2C and a detected position of the contact. Operation of the touch screen 2C can also be called operation of the smartphone 1 including the touch screen 2C. In some embodiments, the touch screen 2C may suitably employ a capacitive system, a resistive film system, or a load-sensing system, as a detecting system.

The controller 10 is capable of determining a type of a gesture, based on at least one of the number of contacts detected by the touch screen 2C, a position at which the contact is detected, variations in the position of the contact detected, a time period of the contact detected, a time interval between the contacts detected, and the number of times of the contacts detected. The smartphone 1 including the controller 10 is capable of executing operations that the controller 10 is capable of executing. In other words, the smartphone 1 may perform operations that the controller 10 performs. The gesture is an operation performed on the touch screen 2C by using a finger. An operation that is performed on the touch screen 2C may be performed on the second display 2B positioned in such a manner as to overlap the first display 2A overlaid on the touch screen 2C. Examples of the gesture determined by the controller 10 via the touch screen 2C include, but are not limited to, touch, long touch, release, swipe, tap, double tap, long tap, drag, flick, pinch-in, and pinch-out operations.

The button 3 is configured to receive an operation input from a user. When receiving the operation input from the user, the button 3 informs the controller 10 about a reception of the operation input. The number of the buttons 3 may be one, or may be two or more. Examples of the button 3 may include a ten key and a QWERTY key.

The illuminance sensor 4 is capable of detecting illuminance. The illuminance is a value of luminous flux entering a measurement face of the illuminance sensor 4 per unit area. The illuminance sensor 4 may be used for adjusting the brightness of the first display 2A, for example.

The proximity sensor 5 is capable of detecting presence of a neighboring object in a non-contact manner. The proximity sensor 5 detects the presence of an object based on a change in magnetic field or a change in a feedback time of a reflected wave of an ultrasonic wave. The proximity sensor 5 may be used for detecting whether a user's face has come closer to the first display 2A, for example. The illuminance sensor 4 and the proximity sensor 5 may be configured in such a manner as to be integrated into one sensor. The illuminance sensor 4 may be used as a proximity sensor.

The communicator 6 is capable of performing wireless communications. The communicator 6 supports wireless communication standards. Examples of the wireless communication standards supported by the communicator 6 include mobile phone communication standards, such as 2G, 3G, and 4G, and short range wireless communication standards. Examples of the mobile phone communication standards include long term evolution (LTE), wideband code division multiple access (W-CDMA), worldwide interoperability for microwave access (WiMAX) (registered trademark), CDMA2000, personal digital cellular (PDC), global system for mobile communications (GSM) (registered trademark), and personal handy-phone system (PHS). Examples of the short range wireless communication standards include IEEE 802.11 (IEEE is short for the Institute of Electrical and Electronics Engineers, Inc.), Bluetooth (registered trademark), infrared data association (IrDA), near field communication (NFC), and wireless personal area network (WPAN). Examples of the WPAN communication standard include ZigBee (registered trademark), digital enhanced cordless telecommunications (DECT), Z-Wave, and wireless smart utility network (WiSun). The communicator 6 may support one or a plurality of the above-mentioned communication standards.

The receiver 7 is capable of converting a sound signal transmitted from the controller 10 into a sound and outputting the sound. The receiver 7 is capable of outputting, for example, the sound of an animation replayed by the smartphone 1, a musical sound, and a voice of a partner during calling. The microphone 8 converts, for example, a user's voice into a sound signal, and transmits the sound signal to the controller 10.

The storage 9 is capable of storing computer programs and data. The storage 9 may be used as a working area for temporarily storing a result of processing by the controller 10. The storage 9 may include any non-transitory storage medium, such as a semiconductor storage medium and a magnetic storage medium. The storage 9 may include a plurality of types of storage media. The storage 9 may include a combination of a storage medium, such as a memory card, an optical disc, or a magneto-optical disc, and a reader for the storage medium. The storage 9 may include a storage device used as a temporary storage area, such as a random access memory (RAM).

The computer program stored in the storage 9 includes an application executed in foreground or background and a basic computer program for supporting operation of the application. For example, when the application is executed in the foreground, the screen of the application is displayed on the first display 2A. Examples of the basic computer program include an operating system (OS). The application and the basic computer program may be installed in the storage 9 via wireless communication by the communicator 6 or a non-transitory storage medium.

The storage 9 is capable of storing, for example, a control program 9A and a set data 9Z.

The control program 9A is capable of providing functions for implementing processing on various operations of the smartphone 1. The functions provided by the control program 9A include a function of adjusting the brightness of the first display 2A based on a result of detection by the illuminance sensor 4. The functions provided by the control program 9A include a function of disabling an operation on the touch screen 2C based on a result of detection by the proximity sensor 5. The functions provided by the control program 9A include a function of implementing a calling by controlling, for example, the communicator 6, the receiver 7, and the microphone 8. The functions provided by the control program 9A include a function of controlling photographing processing by the camera 12 and the camera 13. The functions provided by the control program 9A include a function of controlling communications with an external device connected via the connector 14. The functions provided by the control program 9A include a function of performing various controls, for example, changing information that is presently displayed on the first display 2A, according to a gesture determined based on a result of detection by the touch screen 2C. The functions provided by the control program 9A include a function of detecting a motion, such as a movement or a stop, of a user carrying the smartphone 1 based on a result of detection by the motion sensor 15.

The functions provided by the control program 9A include a function of, upon occurrence of an interrupt event, causing the smartphone 1 to provide notification of the interrupt event by using the first display 2A or notification of the interrupt event by using the second display 2B, according to a notification method determining condition (hereinafter, suitably referred to as the "notification control function"). Examples of the interrupt event include various events accompanied with a sound output and an image display, such as an incoming call, a reception of an electronic mail, alarm sounding, reminder activation by a schedule management application, a reception of a disaster-related notice such as earthquake early warning, and payment by electronic money.

The above-mentioned notification control function includes a function of causing the smartphone 1 to execute processing in which, upon occurrence of an interrupt event, the smartphone 1 determines whether the first display 2A is in a displayed state, and, when a result of the determination indicates that the first display 2A is in a displayed state, then the smartphone 1 provides notification of the interrupt event by using the first display 2A. On the contrary, the above-mentioned notification control function includes a function of causing the smartphone 1 to execute processing in which, when a result of determining whether the first display 2A is in a displayed state indicates that the first display 2A is not in a displayed state, then the smartphone 1 provides notification of an interrupt event by using the second display 2B. The displayed state includes any state in which the first display 2A is turned on, regardless of display contents on the first display 2A.

The above-mentioned notification control function includes a function of causing the smartphone 1 to execute processing in which, upon occurrence of an interrupt event, the smartphone 1 determines whether the interrupt event relates to a communication from a communication partner's device registered in the device (hereinafter, also simply referred to as a communication partner registered in the device), and when a result of the determination indicates that the interrupt event is caused by the communication partner registered in the device, then the smartphone 1 provides notification of the interrupt event by using the first display 2A. On the contrary, the above-mentioned notification control function includes a function of causing the smartphone 1 to execute processing in which, when a result of determining whether an interrupt event is caused by a communication partner registered in the device indicates that the interrupt event is caused not by the communication partner registered in the device, then the smartphone 1 provides notification of the interrupt event by using the second display 2B.

The above-mentioned notification control function includes a function of, upon occurrence of an interrupt event, causing the smartphone 1 to execute various processing mentioned below. That is, the smartphone 1 determines whether the first display 2A is in a displayed state, and, when a result of the determination indicates that the first display 2A is not in a displayed state, then the smartphone 1 provides notification of the interrupt event by using the second display 2B. On the contrary, when a result of the determination indicates that the first display 2A is in a displayed state, subsequently the smartphone 1 determines whether the interrupt event is caused by a communication partner registered in the device. When a result of the determination indicates that the interrupt event is caused by a communication partner registered in the device, then the smartphone 1 provides notification of the interrupt event by using the first display 2A. On the contrary, when a result of determining whether the interrupt event is caused by a communication partner registered in the device indicates that the interrupt event is caused not by a communication partner registered in the device, then the smartphone 1 provides notification of the interrupt event by using the second display 2B.

The set data 9Z includes various data used for processing in the smartphone 1. In the set data 9Z, the above-mentioned notification method determining condition is stored. The notification method determining condition is a condition for determining whether to provide notification of an interrupt event by using the first display 2A or provide notification of the interrupt event by using the second display 2B. The notification method determining condition may include a condition for determining whether to provide notification of an interrupt event based on a result of determination whether the first display 2A is in a displayed state. The notification method determining condition may include a condition for determining whether to provide notification of an interrupt event based on a result of determination whether the interrupt event is caused by a communication partner registered in an address book of the device. The notification method determining condition may include a condition for determining whether to provide notification of an interrupt event based on both a result of determination whether the first display 2A is in a displayed state and a result of determination whether the interrupt event is caused by a communication partner registered in an address book of the device.

Using FIG. 6 and FIG. 7, the notification method determining conditions for notifying an interrupt event are described. FIG. 6 and FIG. 7 are diagrams illustrating examples of the notification method determining conditions according to the embodiments.

Response Condition 1 in FIG. 6 is an example of a condition for responding to a displayed state of the first display 2A. According to Response Condition 1, when the first display 2A is in a displayed state ("Screen is ON"), a subsequent responding way differs depending on whether an interrupt event is "an incoming call or a reception of an electronic mail". Specifically, Response Condition 1 defines that, when an interrupt event is "an incoming call or a reception of an electronic mail", Response Condition 2 (FIG. 7) described later is referred to. On the contrary, Response Condition 1 defines that, when an interrupt event is "other than an incoming call or a reception of an electronic mail", the second display 2B is to be used for notification of the interrupt event. Response Condition 1 defines that, when the first display 2A is not in a displayed state ("Screen is OFF"), the second display 2B is used for notification of an interrupt event.

Response Condition 2 in FIG. 7 is an additional condition referred to when, in Response Condition 1 in FIG. 6, the first display 2A is in a displayed state ("Screen is ON") and an interrupt event is "an incoming call or a reception of an electronic mail". Specifically, Response Condition 2 defines that, when a telephone number of an originator of an incoming call or an address information of an originator of a received electronic mail is registered in an address book (in the case of "registered in an address book"), then the first display 2A is used for notification of the interrupt event. On the contrary, Response Condition 2 defines that, when a telephone number of an originator of an incoming call or an address information of an originator of a received electronic mail is not registered in an address book (in the case of "unregistered in an address book"), then the second display 2B is used for notification of the interrupt event.

As described above, according to the examples of the notification method determining conditions illustrated in FIG. 6 and FIG. 7, when the first display 2A is not in a displayed state, the smartphone 1 basically uses the second display 2B to provide notification of an interrupt event. Exceptionally, only in the case where a condition is satisfied that the first display 2A is in a displayed state and an originator of an incoming call or a received electronic mail having occurred as an interrupt event is registered in an address book, the smartphone 1 uses the first display 2A to provide notification of the interrupt event. Thus, the smartphone 1 reduces electric power consumption by positively using the second display 2B.

The controller 10 is capable of integrally controlling operations of the smartphone 1 to implement various functions. The controller 10 includes an arithmetic processing unit. Examples of the arithmetic processing unit may include, but are not limited to, a central processing unit (CPU), a system-on-a-chip (SoC), a micro control unit (MCU), a field-programmable gate array (FPGA), and a co-processor. The SoC may be combined with other constituent components such as the communicator 6. The controller 10 is an example of a controller.

Specifically, the controller 10 executes commands included in a computer program stored in the storage 9, with reference to data stored in the storage 9, as necessary. The controller 10 implements various functions by controlling a function module according to the data and the command. The function module includes, but is not limited to at least one of, for example, the first display 2A, the second display 2B, the communicator 6, the microphone 8, and the speaker 11. The controller 10 may change the control according to a result of detection by a detecting module. The detecting module includes, but is not limited to, for example, the touch screen 2C, the button 3, the illuminance sensor 4, the proximity sensor 5, the microphone 8, the camera 12, the camera 13, and the motion sensor 15.

By executing the control program 9A, the controller 10 can execute processing to, upon occurrence of an interrupt event, provide notification of the interrupt event by using the first display 2A or provide notification of the interrupt event by using the second display 2B, according to the notification method determining condition.

For example, upon occurrence of an interrupt event, the controller 10 can determine whether the first display 2A is in a displayed state. When a result of the determination indicates that the first display 2A is in a displayed state, the controller 10 can provide notification of the interrupt event by using the first display 2A. On the contrary, when a result of determining whether the first display 2A is in a displayed state indicates that the first display 2A is not in a displayed state, then the controller 10 can provide notification of the interrupt event by using the second display 2B.

For example, upon occurrence of an interrupt event, the controller 10 can determine whether the interrupt event is caused by a communication partner registered in the device. When a result of the determination indicates that the interrupt event is caused by a communication partner registered in the device, then the controller 10 can provide notification of the interrupt event by using the first display 2A. On the contrary, when a result of the determination indicates that the interrupt event is caused not by a communication partner registered in the device, then the controller 10 can provide notification of the interrupt event by using the second display 2B.

For example, upon occurrence of an interrupt event, the controller 10 can determine whether the first display 2A is in a displayed state. When a result of the determination indicates that the first display 2A is not in a displayed state, then the controller 10 can provide notification of the interrupt event by using the second display 2B. On the contrary, when a result of determining whether the first display 2A is in a displayed state indicates that the first display 2A is in a displayed state, then the controller 10 can determine whether the interrupt event is caused by a communication partner registered in the device. When a result of the determination indicates that the interrupt event is caused by a communication partner registered in the device, then the controller 10 can provide notification of the interrupt event by using the first display 2A. On the contrary, when a result of determining whether the interrupt event is caused by a communication partner registered in the device indicates that the interrupt event is caused not by a communication partner registered in the device, then the controller 10 can provide notification of the interrupt event by using the second display 2B.

The speaker 11 is capable of outputting a sound signal transmitted from the controller 10, as a sound. The speaker 11 may output a ring tone and music, for example. One of the receiver 7 and the speaker 11 may also serve the function of the other one.

The camera 12 and the camera 13 are capable of converting a captured image into an electrical signal. The camera 12 may be a front side camera for capturing an image of an object facing the first display 2A. The camera 13 may be a rear side camera for capturing an image of an object facing another face of the first display 2A on the opposite side. The camera 12 and the camera 13 may be mounted in the smartphone 1 in a state of being functionally and physically integrated into one camera unit that is usable with switching between the functions of a front side camera and a rear side camera.

The connector 14 is a terminal to which other devices are connected. The connector 14 may be a universal terminal, such as a universal serial bus (USB), high-definition multimedia interface (HDMI) (registered trademark), a light peak (Thunderbolt (registered trademark)), or an earphone-microphone connector. The connector 14 may be a terminal for dedicated use, such as a Dock connector. Examples of the devices connected to the connector 14 include, but are not limited to, an external storage, a speaker, and a communication device.

The motion sensor 15 is capable of detecting various information for determining operation of a user carrying the smartphone 1. The motion sensor 15 may be configured as a sensor unit including, for example, an accelerometer, a orientation sensor, a gyro sensor, a magnetic sensor, and an atmospheric pressure sensor.

Besides the above-mentioned function modules, the smartphone 1 may include a GPS receiver and a vibrator. The GPS receiver receives radio wave signals in a predetermined frequency band from GPS Satellites. The GPS receiver demodulates the received radio wave signals, and transmits the demodulated signals to the controller 10. The GPS receiver supports operation processing for the present position of the smartphone 1. The smartphone 1 may include a receiver capable of receiving a signal from an artificial satellite for positioning, other than GPS satellites, and thereby perform operation processing for the present position. The vibrator vibrates a part or entirety of the smartphone 1. The vibrator includes, for example, a piezoelectric element or an eccentric motor in order to generate vibration. Besides the GPS receiver and the vibrator, the smartphone 1 is mounted with a function module that is inevitably used for maintaining the functions of the smartphone 1, such as a battery, and a control module that is inevitably used for controlling the smartphone 1.

The smartphone 1 may access a storage server on a cloud via the communicator 6 to acquire various computer programs and data.

Using FIG. 8 to FIG. 12, outlines of processing executed by the smartphone 1 are described. FIG. 8 to FIG. 12 are diagrams illustrating the outlines of the processing by the smartphone according to the embodiments.

Figure 8:
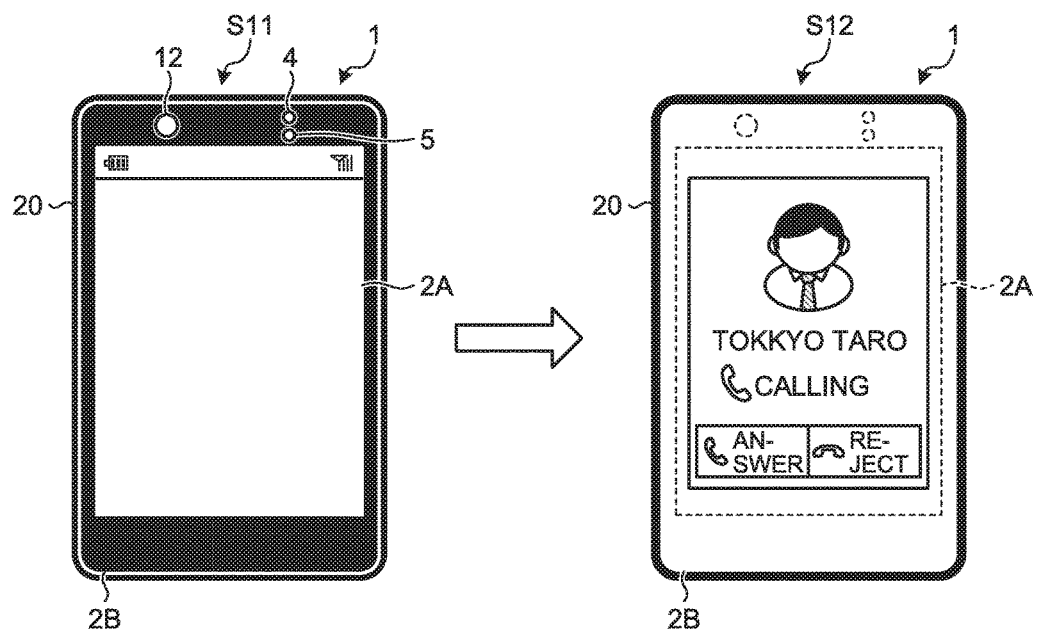
FIG. 8 is a diagram illustrating an outline of processing by the smartphone according to the embodiments.
Figure 9:
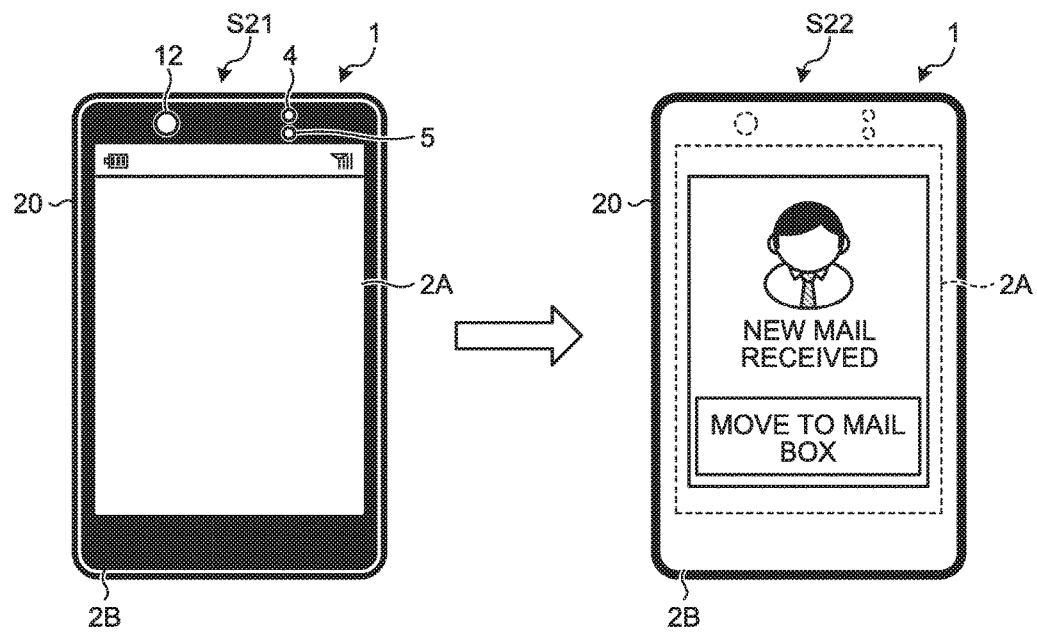
FIG. 9 is a diagram illustrating an outline of processing by the smartphone according to the embodiments.
Figure 10:
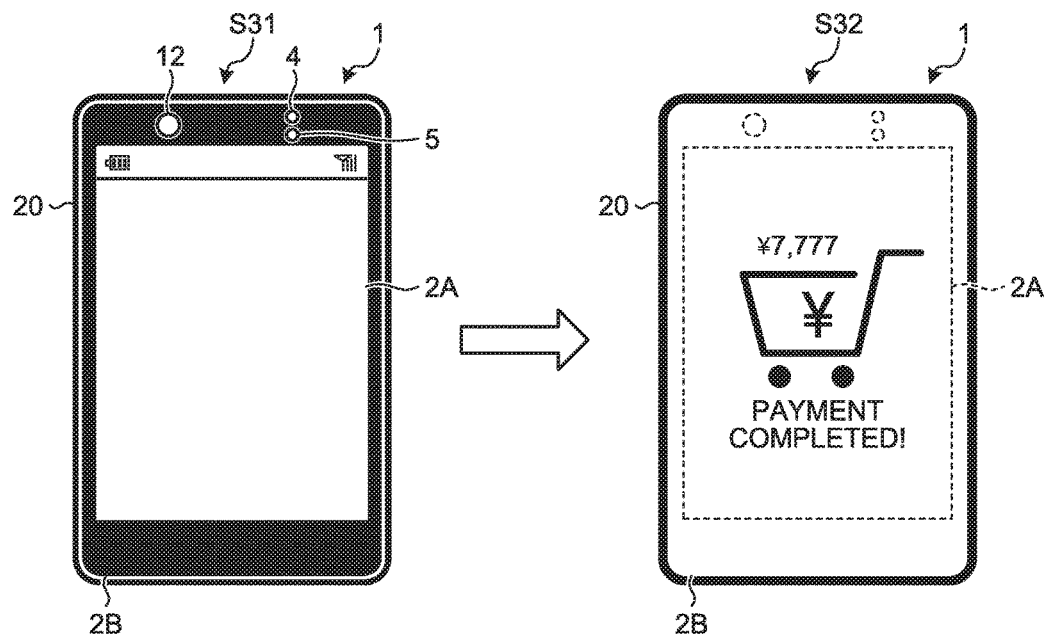
FIG. 10 is a diagram illustrating an outline of processing by the smartphone according to the embodiments.
Figure 11:
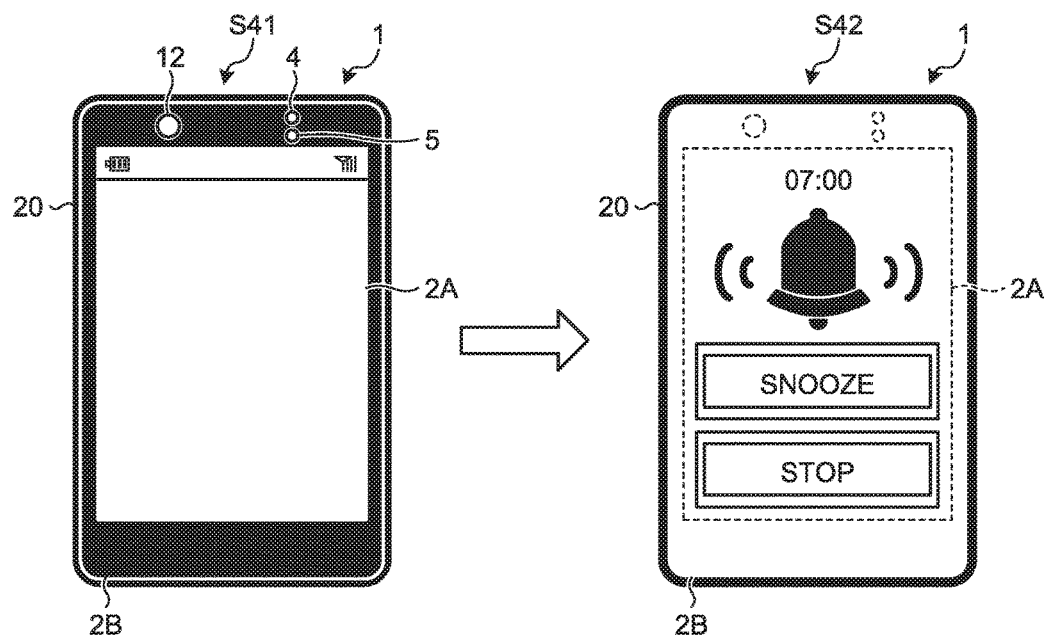
FIG. 11 is a diagram illustrating an outline of processing by the smartphone according to the embodiments.

FIG. 8 illustrates the outline of the processing performed when the first display 2A is not in a displayed state at a time of reception of an incoming call. FIG. 9 illustrates the outline of the processing performed when the first display 2A is not in a displayed state at a time of a reception of an electronic mail. FIG. 10 illustrates the outline of the processing performed when the first display 2A is not in a displayed state at a time of payment with electronic money. FIG. 11 illustrates the outline of the processing performed when the first display 2A is not in a displayed state at a time of alarm sounding. As described below, when the first display 2A is not in a displayed state at a time of occurrence of an interrupt event, the smartphone 1 provides notification of the interrupt event by using the second display 2B.

For example, as illustrated in FIG. 8, upon a reception of an incoming call as an interrupt event, the smartphone 1 determines whether the first display 2A is in a displayed state, and when it is determined that the first display 2A is not in a displayed state (Step S11), then the smartphone 1 provides notification of the incoming call by using the second display 2B (Step S12).

For example, as illustrated in FIG. 9, upon a reception of an electronic mail as an interrupt event, the smartphone 1 determines whether the first display 2A is in a displayed state, and when it is determined that the first display 2A is not in a displayed state (Step S21), then the smartphone 1 provides notification of the reception of the electronic mail by using the second display 2B (Step S22).

For example, as illustrated in FIG. 10, once payment with electronic money is made as an interrupt event, the smartphone 1 determines whether the first display 2A is in a displayed state, and when it is determined that the first display 2A is not in a displayed state (Step S31), then the smartphone 1 provides notification of the payment with electronic money by using the second display 2B (Step S32).

For example, as illustrated in FIG. 11, once processing for sounding an alarm is performed as an interrupt event, the smartphone 1 determines whether the first display 2A is in a displayed state, and when it is determined that the first display 2A is not in a displayed state (Step S41), then the smartphone 1 provides notification of the alarm sounding by using the second display 2B (Step S42).

Figure 12:
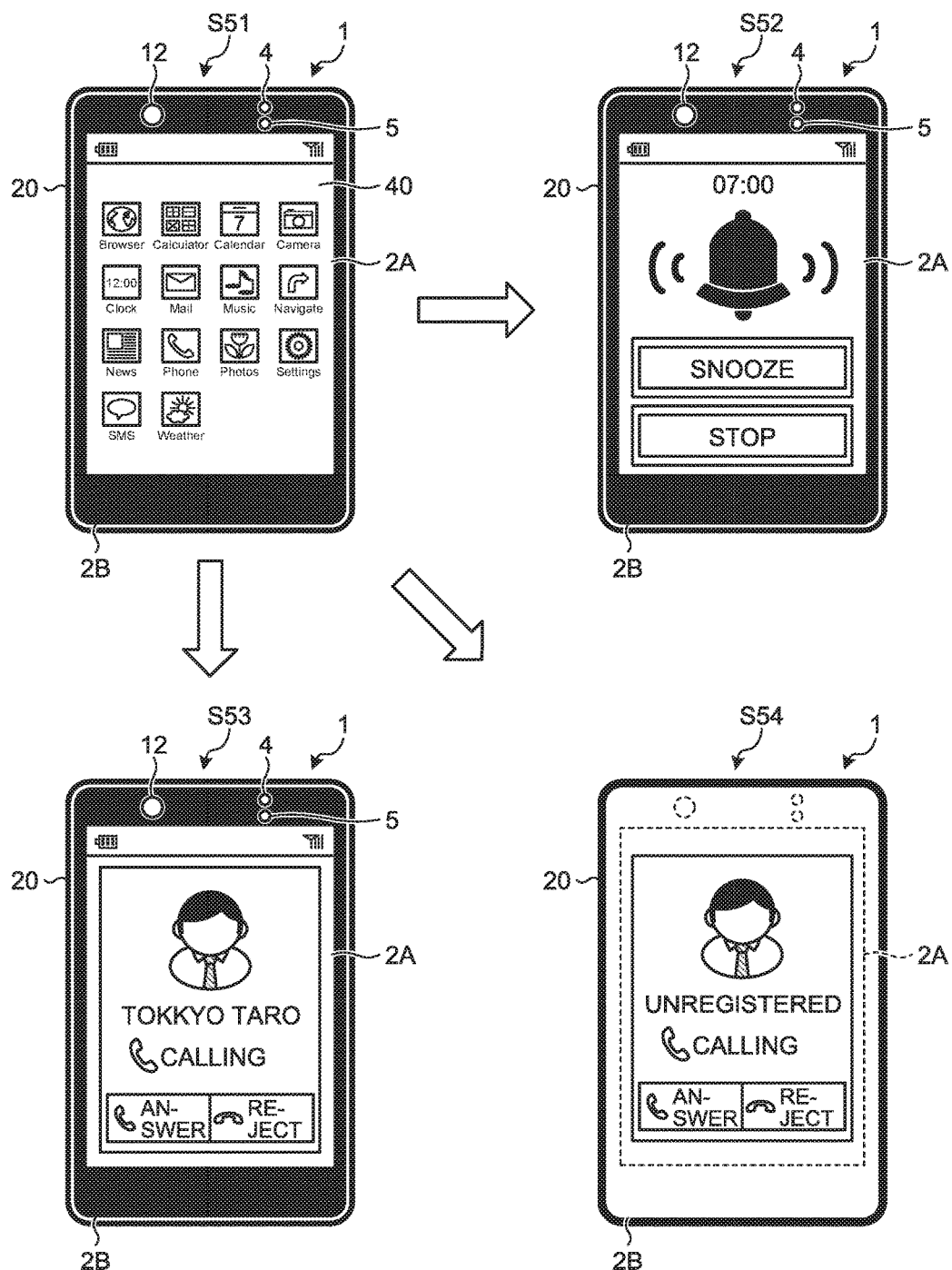
FIG. 12 is a diagram illustrating an outline of processing by the smartphone according to the embodiments.

FIG. 12 illustrates the outline of the processing performed when an interrupt event occurs while the first display 2A is in a displayed state.

As illustrated in FIG. 12, once processing for sounding an alarm is performed as an interrupt event, the smartphone 1 determines whether the first display 2A is in a displayed state, and when it is determined that the first display 2A is in a displayed state (Step S51), then the smartphone 1 continues to use the first display 2A for the notification of the alarm sounding (Step S52).

Upon a reception of an incoming call as an interrupt event, the smartphone 1 determines whether the first display 2A is in a displayed state, and when it is determined that the first display 2A is in a displayed state (Step S51), then the smartphone 1 continues to use the first display 2A for the notification of the incoming call under the condition that the telephone number of an originator of the incoming call is registered in a telephone directory (Step S53). On the contrary, when the telephone number of the originator of the incoming call is not registered in the telephone directory, then the smartphone 1 provides notification of the incoming call by using the second display 2B (Step S54).

In the processing at Step S54, the smartphone 1 may turn off the light of the first display 2A to make the first display 2A invisible, or may keep the displayed state of the first display 2A as it is.

Figure 13:
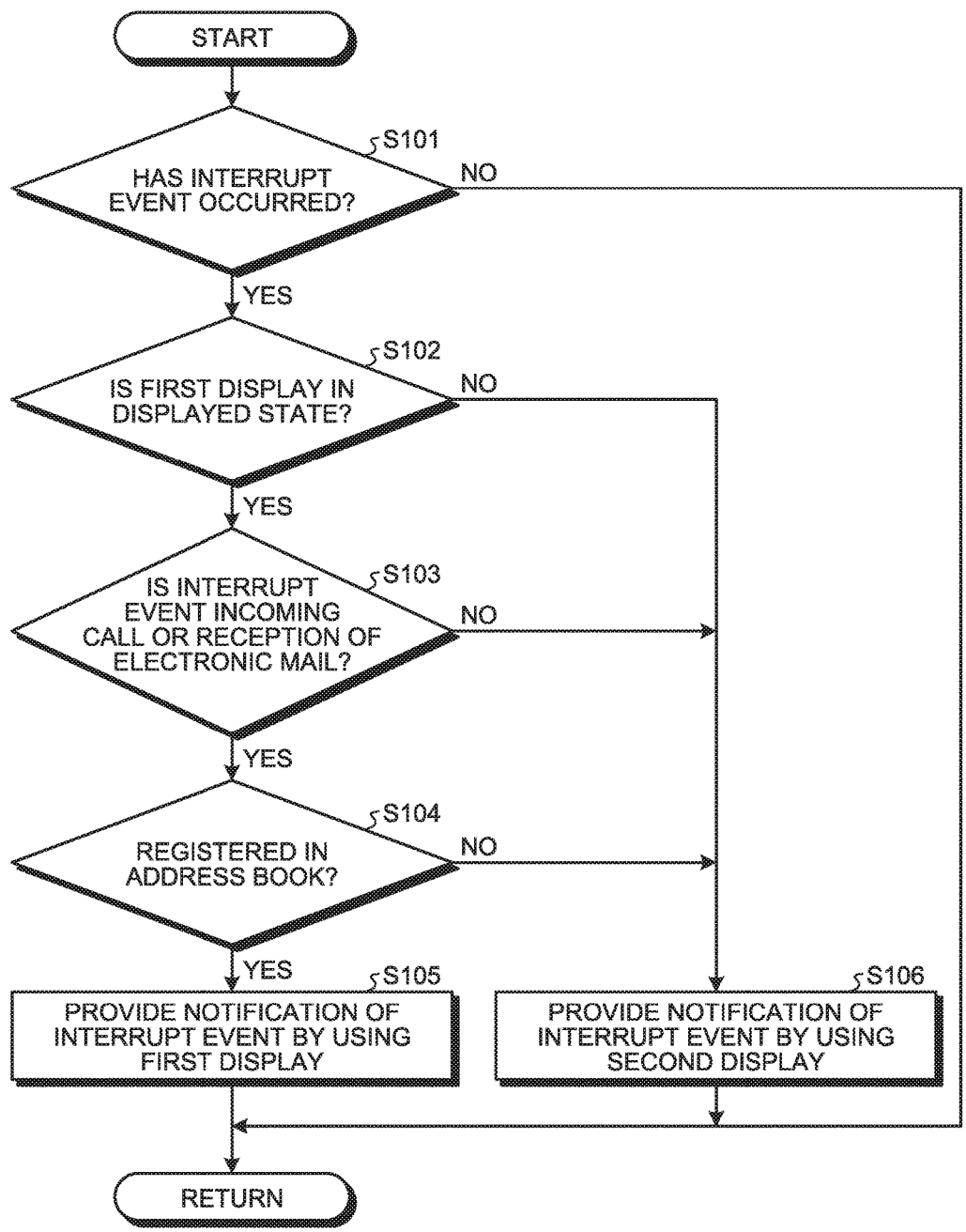
FIG. 13 is a flowchart illustrating an example of processing executed by the smartphone according to the embodiments.

Using FIG. 13, an example of a flow of processing executed by the smartphone 1 is described. FIG. 13 is a flowchart illustrating an example of processing executed by the smartphone according to the embodiments. The processing illustrated in FIG. 13 is implemented by executing the control program 9A by the controller 10. As long as the smartphone 1 is in an operable state, the processing illustrated in FIG. 13 is repeatedly executed also in a mode for partially controlling electric power supply, what is called a power saving mode.

As illustrated in FIG. 13, the controller 10 determines whether an interrupt event has occurred (Step S101).

When a result of the determination indicates that an interrupt event has occurred (Yes at Step S101), then the controller 10 determines whether the first display 2A is in a displayed state (Step S102).

When a result of the determination indicates that the first display 2A is in a displayed state (Yes at Step S102), then the controller 10 determines whether the interrupt event is an incoming call or a reception of an electronic mail (Step S103).

When a result of the determination indicates that the interrupt event is an incoming call or a reception of an electronic mail (Yes at Step S103), then the controller 10 determines whether a telephone number of an originator of the incoming call or an address information of an originator of the received electronic mail is registered in an address book (Step S104).

When a result of the determination indicates that the telephone number of the originator of the incoming call or the address information of the originator of the received electronic mail is registered in the address book (Yes at Step S104), then the controller 10 provides notification of the interrupt event by using the first display 2A (Step S105), and the process returns to the determination at Step S101.

On the contrary, when a result of the determination indicates that the telephone number of the originator of the incoming call or the address information of the originator of the received electronic mail is not registered in the address book (No at Step S104), then the controller 10 provides notification of the interrupt event by using the second display 2B (Step S106), and the process returns to the determination at Step S101.

When a result of the determination at Step S103 indicates that the interrupt event is neither an incoming call nor a reception of an electronic mail (No at Step S103), the controller 10 provides notification of the interrupt event by using the second display 2B (Step S106), and the process returns to the determination at Step S101.

When a result of the determination at Step S102 indicates that the first display 2A is not in a displayed state (No at Step S102), the controller 10 provides notification of the interrupt event by using the second display 2B (Step S106), and the process returns to the determination at Step S101.

When a result of the determination at Step S101 indicates that any interrupt event has not occurred (No at Step S101), the controller 10 repeats the determination at Step S101.

According to the above-described embodiments, when the first display 2A is not in a displayed state, the smartphone 1 uses the second display 2B to provide notification of an interrupt event. Furthermore, even when the first display 2A is in a displayed state, unless an originator of an incoming call or a received electronic mail having occurred as an interrupt event is a communication partner known to the user of the device, the smartphone 1 uses the second display 2B to provide notification of the interrupt event. The smartphone 1 thus positively uses the second display 2B to provide notification of an interrupt event, and thereby can reduce electric power consumption.

In the above-described embodiments, an example has been described in which the smartphone 1 executes procedures of Step S101 to Step S106 illustrated in FIG. 13 to determine a method of providing notification of an interrupt event, but the embodiments are not limited to this example. For example, the smartphone 1 may determine whether the first display 2A is in a displayed state, and, only based on a result of the determination, determine a notification method. This notification method is applied when the smartphone 1 executes the procedures of Step S101, Step S102, Step S105, and Step S106 in FIG. 13.

In the above-described embodiments, the smartphone 1 may determine whether a telephone number of an originator of an incoming call having occurred as an interrupt event or an address of an originator of a received electronic mail upon occurrence of a reception of the electronic mail as an interrupt event is registered in an address book, and, only based on a result of the determination, the smartphone 1 may determine a notification method. This notification method is applied when the smartphone 1 executes the procedures of Step S101 and Step S103 to Step S106 in FIG. 13.

Regarding the processing in which the smartphone 1 determines a notification method based on a result of determining whether an interrupt event is caused by a communication partner registered in the device, a target interrupt event is not limited to an incoming call or a reception of an electronic mail. For example, also in a case where an interrupt event having occurred in the smartphone 1 is a notification related to an application, such as a social network service (SNS), the same processing as the processing for determining a notification method for responding to an incoming call or a reception of an electronic mail can be applied. For example, when an event occurs in a SNS installed in the device, the smartphone 1 determines whether an originator of the event is a partner who has a predetermined relation via the SNS, and when the originator is a communication partner having the predetermined relation, the smartphone 1 provides notification by using the first display 2A, and on the contrary, when the originator is not a communication partner having the predetermined relation, then the smartphone 1 provides notification by using the second display 2B. Examples of the predetermined relation include a relation such that a communication partner is registered as a friend of the user of the smartphone 1 in the SNS, a relation such that a communication partner is registered as a friend of a member registered as a friend of the user of the smartphone 1, and a relation such that a communication partner also belongs to a group in the SNS to which the user of the smartphone 1 belongs.

Figure 14:
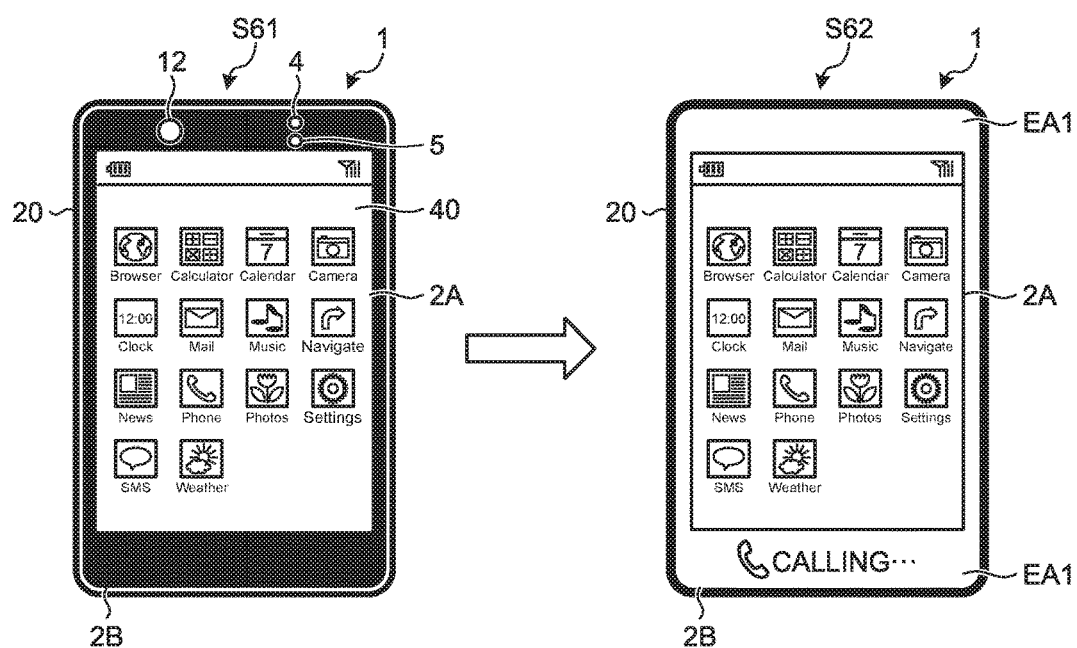
FIG. 14 is a diagram illustrating an example of a method for providing notification of an interrupt event according to other embodiments.

Another example of a method for providing notification of an interrupt event is described using FIG. 14. FIG. 14 is a diagram illustrating an example of a method for providing notification of an interrupt event according to other embodiments. The smartphone 1 may provide notification of an interrupt event by using a display area of the second display 2B, the area not overlapping the display face of the first display 2A.

For example, as illustrated in FIG. 14, the smartphone 1 brings the display area of the second display 2B, the area corresponding to the display face of the first display 2A, into the transmissive state M1, thereby controlling the first display 2A to be visible by a user (Step S61, Step S62). Furthermore, the smartphone 1 brings a ring-shaped display area EA1 formed outside the display face of the first display 2A so as to surround the display face into the reflective state M2, thereby controlling the display area EA1 to be visible by a user (Step S61, Step S62). Subsequently, the smartphone 1 provides notification of an interrupt event (for example, an incoming call) by using the display area EA1 of the second display 2B (Step S62). This configuration allows the smartphone 1 to easily use the first display 2A even while the smartphone 1 is providing notification of an interrupt event by using the second display 2B according to the notification method determining condition.

The above-described embodiments describe an example of processing that the smartphone 1 performs after determining whether the first display 2A is in a displayed state upon occurrence of an interrupt event. Hereinafter, an example of processing is described that the smartphone 1 performs after determining whether the second display 2B is in a displayed state upon occurrence of an interrupt event, according to a determination result.

A functional configuration of the smartphone 1 according to the other embodiments is basically the same as that of the above-described embodiments, but differs in the following points.

A notification control functions provided by the control program 9A include a function of causing the smartphone 1 to execute processing in which, upon occurrence of an interrupt event, the smartphone 1 determines whether the second display 2B is in a displayed state, and when a result of the determination indicates that the second display 2B is in a displayed state, then the smartphone 1 provides notification of the interrupt event by using the second display 2B. On the contrary, the notification control functions include a function of causing the smartphone 1 to execute processing in which, when a result of determining whether the second display 2B is in a displayed state indicates that the second display 2B is not in a displayed state, then the smartphone 1 provides notification of the interrupt event by using the first display 2A.

The notification control functions include a function of causing the smartphone 1 to execute processing in which, upon occurrence of an interrupt event, the smartphone 1 determines whether the interrupt event is caused by a communication partner registered in the device, and when a result of the determination indicates that the interrupt event is caused by a communication partner registered in the device, then the smartphone 1 provides notification of the interrupt event by using the first display 2A. On the contrary, the notification control functions include a function of causing the smartphone 1 to execute processing in which, when a result of determining whether the interrupt event is caused by a communication partner registered in the device indicates that the interrupt event is caused not by a communication partner registered in the device, then the smartphone 1 provides notification of the interrupt event by using the second display 2B.

The notification control functions include a function of causing the smartphone 1 to execute various processing mentioned below upon occurrence of an interrupt event. That is, the smartphone 1 determines whether the second display 2B is in a displayed state, and, when a result of the determination indicates that the second display 2B is not in a displayed state, then the smartphone 1 provides notification of the interrupt event by using the first display 2A. On the contrary, when a result of the determination indicates that the second display 2B is in a displayed state, subsequently the smartphone 1 determines whether the interrupt event is caused by a communication partner registered in the device. When a result of the determination indicates that the interrupt event is caused by a communication partner registered in the device, then the smartphone 1 provides notification of the interrupt event by using the first display 2A. On the contrary, when a result of determining whether the interrupt event is caused by a communication partner registered in the device indicates that the interrupt event is caused not by a communication partner registered in the device, then the smartphone 1 provides notification of the interrupt event by using the second display 2B.

Using FIG. 15 and FIG. 16, the notification method determining conditions for notifying an interrupt event according to other embodiments are described. FIG. 15 and FIG. 16 are diagrams illustrating an example of the notification method determining conditions according to the other embodiments.

Response Condition 3 in FIG. 15 indicates an example of a condition for responding to a displayed state of the second display 2B. According to Response Condition 3, when the second display 2B is in a displayed state ("Screen is ON"), a subsequent responding way differs depending on whether an interrupt event is "an incoming call or a reception of an electronic mail". Specifically, Response Condition 3 defines that, when an interrupt event is "an incoming call or a reception of an electronic mail", then Response Condition 4 (FIG. 16) described later is referred to. On the contrary, Response Condition 3 defines that, when an interrupt event is "other than an incoming call or a reception of an electronic mail", then the second display 2B continues to be used for notification of the interrupt event. Response Condition 3 defines that, when the second display 2B is not in a displayed state ("Screen is OFF"), then the first display 2A is used for notification of the interrupt event.

Response Condition 4 in FIG. 16 is an additional condition referred to when, in Response Condition 3 in FIG. 15, the second display 2B is in a displayed state ("Screen is ON") and an interrupt event is "an incoming call or a reception of an electronic mail". Specifically, Response Condition 4 defines that, when a telephone number of an originator of an incoming call or an address information of an originator of a received electronic mail is registered in an address book (in the case of "registered in an address book"), then the first display 2A is used for notification of the interrupt event. On the contrary, Response Condition 4 defines that, when a telephone number of an originator of an incoming call or an address information of an originator of a received electronic mail is not registered in an address book (in the case of "unregistered in an address book"), then the second display 2B is used for notification of the interrupt event.

As described above, according to the examples of the notification method determining conditions illustrated in FIG. 15 and FIG. 16, when the second display 2B is in a displayed state, the smartphone 1 basically uses the second display 2B to provide notification of an interrupt event. Exceptionally, only in the case where a condition is satisfied that, even when the second display 2B is in a displayed state, an originator of an incoming call or a received electronic mail having occurred as an interrupt event is registered in an address book, the smartphone 1 uses the first display 2A to provide notification of the interrupt event. Thus, the smartphone 1 reduces electric power consumption by positively using the second display 2B.

By executing the control program 9A, upon occurrence of an interrupt event, the controller 10 can execute processing to provide notification of the interrupt event by using the first display 2A or provide notification of the interrupt event by using the second display 2B, according to the notification method determining condition.

For example, upon occurrence of an interrupt event, the controller 10 can determine whether the second display 2B is in a displayed state. When a result of the determination indicates that the second display 2B is in a displayed state, then the controller 10 can provide notification of the interrupt event by using the second display 2B. On the contrary, when a result of determining whether the second display 2B is in a displayed state indicates that the second display 2B is not in a displayed state, then the controller 10 can provide notification of the interrupt event by using the first display 2A.

For example, upon occurrence of an interrupt event, the controller 10 can determine whether the second display 2B is in a displayed state. When a result of the determination indicates that the second display 2B is not in a displayed state, then the controller 10 can provide notification of the interrupt event by using the first display 2A. On the contrary, when a result of determining whether the second display 2B is in a displayed state indicates that the second display 2B is in a displayed state, then the controller 10 can determine whether the interrupt event is caused by a communication partner registered in the device. When a determination result indicates that the interrupt event is caused by a communication partner registered in the device, then the controller 10 can provide notification of the interrupt event by using the first display 2A. On the contrary, when a result of determining whether the interrupt event is caused by a communication partner registered in the device indicates that the interrupt event is caused not by a communication partner registered in the device, then the controller 10 can provide notification of the interrupt event by using the second display 2B.

Figure 17:
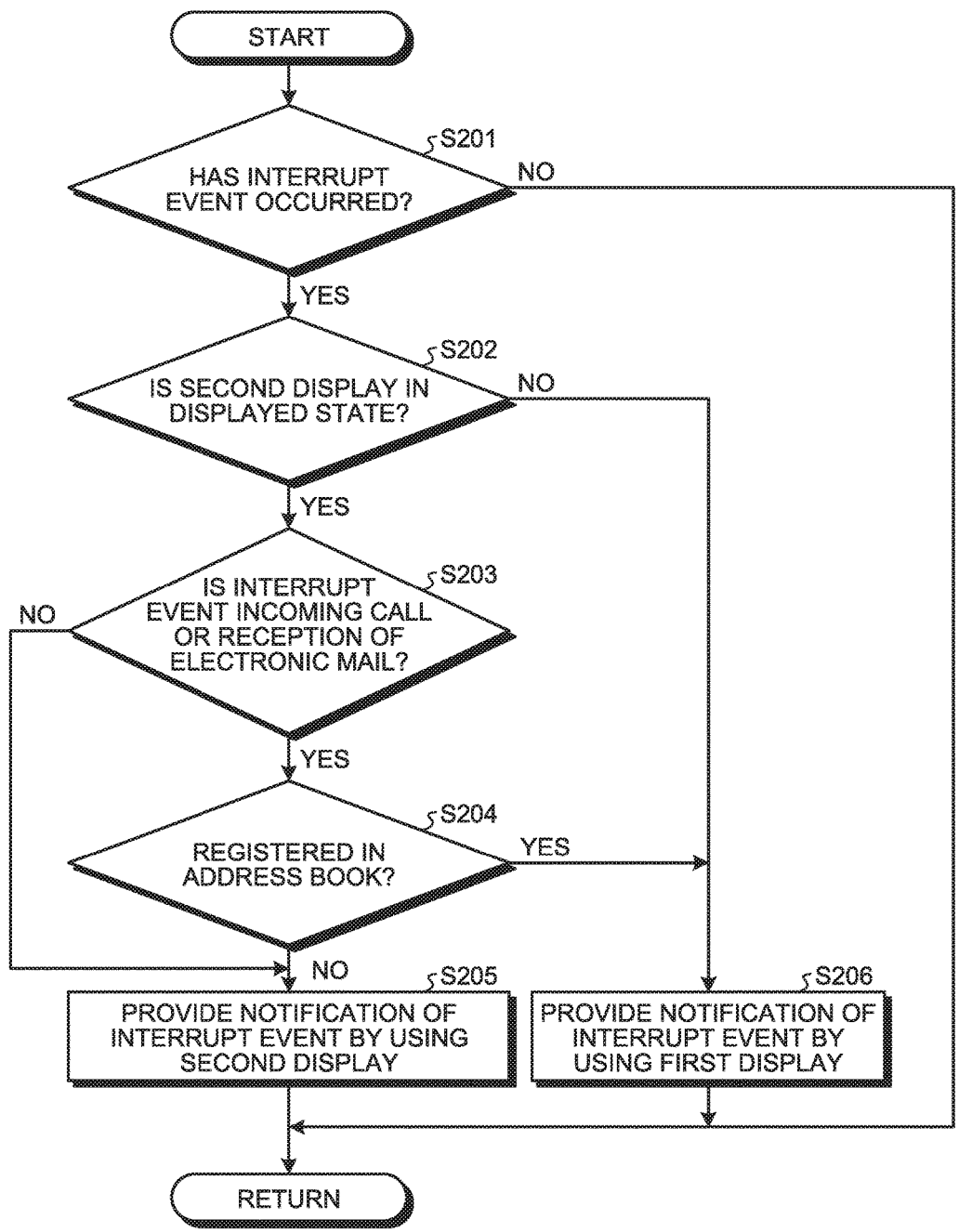
FIG. 17 is a flowchart illustrating an example of processing executed by the smartphone according to the other embodiments.

Using FIG. 17, an example of a flow of processing executed by the smartphone 1 according to the other embodiments is described. FIG. 17 is a flowchart illustrating an example of processing executed by the smartphone according to the other embodiments. The processing illustrated in FIG. 17 is implemented by executing the control program 9A by the controller 10. As long as the smartphone 1 is in an operable state, the processing illustrated in FIG. 17 is repeatedly executed also in a mode for partially controlling electric power supply, what is called a power saving mode.

As illustrated in FIG. 17, the controller 10 determines whether an interrupt event has occurred (Step S201).

When a result of the determination indicates that an interrupt event has occurred (Yes at Step S201), then the controller 10 determines whether the second display 2B is in a displayed state (Step S202).

When a result of the determination indicates that the second display 2B is in a displayed state (Yes at Step S202), then the controller 10 determines whether the interrupt event is an incoming call or a reception of an electronic mail (Step S203).

When a result of the determination indicates that the interrupt event is an incoming call or a reception of an electronic mail (Yes at Step S203), then the controller 10 determines whether a telephone number of an originator of the incoming call or an address information of an originator of the received electronic mail is registered in an address book (Step S204).

When a result of the determination indicates that the telephone number of the originator of the incoming call or the address information of the originator of the received electronic mail is not registered in the address book (No at Step S204), then the controller 10 provides notification of the interrupt event by using the second display 2B (Step S205), and the process returns to the determination at Step S201.

On the contrary, when a result of the determination indicates that the telephone number of the originator of the incoming call or the address information of the originator of the received electronic mail is registered in the address book (Yes at Step S204), then the controller 10 provides notification of the interrupt event by using the first display 2A (Step S206), and the process returns to the determination at Step S201.

When a result of the determination at Step S203 indicates that the interrupt event is neither an incoming call nor a reception of an electronic mail (No at Step S203), then the controller 10 provides notification of the interrupt event by using the second display 2B (Step S205), and the process returns to the determination at Step S201.

When a result of the determination at Step S202 indicates that the second display 2B is not in a displayed state (No at Step S202), then the controller 10 provides notification of the interrupt event by using the first display 2A (Step S206), and the process returns to the determination at Step S201.

According to the above-described other embodiments, when the second display 2B is in a displayed state, the smartphone 1 uses the second display 2B to provide notification of an interrupt event. Furthermore, even when the second display 2B is in a displayed state, only in the case where an originator of an incoming call or a received electronic mail having occurred as an interrupt event is a communication partner known to the user of the device, the smartphone 1 uses the first display 2A to provide a notification of the interrupt event. The smartphone 1 thus positively uses the second display 2B to provide notification of an interrupt event, and thereby can reduce electric power consumption.

In the above-described other embodiments, the smartphone 1 may determine whether the second display 2B is in a displayed state, and, based on only a result of the determination, determine a notification method. This notification method can be implemented by executing the procedures of Step S201, Step S202, Step S205, and Step S206 in FIG. 17 by the smartphone 1.

In the above-described other embodiments, the smartphone 1 may determine whether a telephone number of an originator of an incoming call having occurred as an interrupt event or an address of an originator of a received electronic mail upon occurrence of a reception of the mail as an interrupt event is registered in an address book, and, only based on a result of the determination, determine a notification method. This notification method is applied when the smartphone 1 executes the procedures of Step S201 and Step S203 to Step S206 in FIG. 17.

Also in the above-described other embodiments, in the case where an interrupt event having occurred in the smartphone 1 is a notification related to an application such as a SNS, the same processing as the processing for determining a notification method for responding to an incoming call or a reception of an electronic mail can be applied.

In the above-described embodiments, a case in which the second display 2B is a polymer network liquid crystal display has been described, but the second display 2B is not limited to this, and may be electronic paper.

The Response Condition 1 may define that, when an interrupt event is "other than an incoming call or a reception of an electronic mail", the first display 2A continues to be used for notification of the interrupt event.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile electronic device, comprising:
   a first display;
   a second display overlaid on the first display and switchable between a transmissive state in which incident light is allowed to be transmitted and a reflective state in which incident light is allowed to be reflected;
   a storage configured to store therein a notification method determining condition for determining whether to provide notification of an interrupt event by using the first display or provide the notification of the interrupt event by using the second display; and
   at least one controller configured to, upon occurrence of the interrupt event, provide the notification of the interrupt event by using the first display or provide the notification of the interrupt event by using the second display, according to the notification method determining condition, wherein
   the storage is further configured to store therein, as the notification method determining condition, a condition for providing the notification according to a result of determination whether the first display is in a displayed state, and
   upon the occurrence of the interrupt event, the at least one controller is further configured to determine whether the first display is in the displayed state, and
   when the result of the determination indicates that the first display is in the displayed state, then the at least one controller provides the notification of the interrupt event by using the first display, according to the notification method determining condition, and
   when the result of the determination indicates that the first display is not in the displayed state, then the controller provides the notification of the interrupt event by using the second display, according to the notification method determining condition.

2. The mobile electronic device according to claim 1, wherein
   the storage is further configured to store therein, as the notification method determining condition, a condition for providing the notification according to a result of determination whether the interrupt event is caused by a communication partner registered in an address book of the device, and
   upon the occurrence of the interrupt event, the at least one controller is further configured to determine whether the interrupt event is caused by the communication partner registered in the device, and
   when the result of the determination indicates that the interrupt event is caused by the communication partner registered in the device, then the at least one controller provides the notification of the interrupt event by using the first display, according to the notification method determining condition, and
   when the result of the determination indicates that the interrupt event is caused not by the communication partner registered in the device, then the at least one controller provides the notification of the interrupt event by using the second display, according to the notification method determining condition.

3. The mobile electronic device according to claim 1, wherein
   the storage is further configured to store therein, as the notification method determining condition, a result of determination whether the interrupt event is caused by a communication partner registered in an address book of the device, and
   when the result of the determination indicates that the first display is not in the displayed state, then the at least one controller provides the notification of the interrupt event by using the second display, according to the notification method determining condition,
   whereas, when the result of the determination indicates that the first display is in the displayed state, then the at least one controller is further configured to determine whether the interrupt event is caused by the communication partner registered in the device,
   when the result of the determination indicates that the interrupt event is caused by the communication partner registered in the device, then the at least one controller provides the notification of the interrupt event by using the first display, according to the notification method determining condition, and
   whereas, when the result of the determination indicates that the interrupt event is caused not by the communication partner registered in the device, then the at least one controller provides the notification of the interrupt event by using the second display, according to the notification method determining condition.

4. The mobile electronic device according to claim 1, wherein
   the storage is further configured to store therein, as the notification method determining condition, a condition for providing the notification according to a result of determination whether the second display is in a displayed state, and
   upon the occurrence of the interrupt event, the at least one controller is further configured to determine whether the second display is in the displayed state, and
   when the result of the determination indicates that the second display is in the displayed state, then the at least one controller provides the notification of the interrupt event by using the second display, according to the notification method determining condition, and
   when the result of the determination indicates that the second display is not in the displayed state, then the at least one controller provides the notification of the interrupt event by using the first display, according to the notification method determining condition.

5. The mobile electronic device according to claim 1, wherein
  the storage is further configured to store therein, as the notification method determining condition, a condition for providing the notification according to a result of determination whether the second display is in a displayed state and a result of determination whether the interrupt event is caused by a communication partner registered in an address book of the device, and
  upon the occurrence of the interrupt event, the at least one controller is further configured to determine whether the second display is in the displayed state and,
  when the result of the determination indicates that the second display is not in the displayed state, then the at least one controller provides the notification of the interrupt event by using the first display, according to the notification method determining condition,
  whereas, when the result of the determination indicates that the second display is in the displayed state, then the controller is further configured to determine whether the interrupt event is caused by the communication partner registered in the device, and
  when the result of the determination indicates that the interrupt event is caused by the communication partner registered in the device, then the at least one controller provides the notification of the interrupt event by using the first display, according to the notification method determining condition, and
  whereas, when the result of the determination indicates that the interrupt event is caused not by the communication partner registered in the device, then the at least one controller provides the notification of the interrupt event by using the second display, according to the notification method determining condition.

6. A control method executed by a mobile electronic device comprising:
  a first display;
  a second display overlaid on the first display and switchable between a transmissive state in which incident light is allowed to be transmitted and a reflective state in which incident light is allowed to be reflected; and
  a storage configured to store therein a notification method determining condition for determining whether to provide notification of an interrupt event by using the first display or provide the notification of the interrupt event by using the second display,
  the control method comprising, upon occurrence of the interrupt event, providing the notification of the interrupt event by using the first display or providing the notification of the interrupt event by using the second display, according to the notification method determining condition, wherein
  the storage is further configured to store therein, as the notification method determining condition, a condition for providing the notification according to a result of determination whether the first display is in a displayed state, and
  the control method further comprising:
    upon the occurrence of the interrupt event, determining whether the first display is in the displayed state;
    when the result of the determination indicates that the first display is in the displayed state, then providing the notification of the interrupt event by using the first display, according to the notification method determining condition; and
    when the result of the determination indicates that the first display is not in the displayed state, then providing the notification of the interrupt event by using the second display, according to the notification method determining condition.

7. A non-transitory storage medium that stores therein a control program for causing a mobile electronic device to execute providing notification of an interrupt event, the mobile electronic device comprising:
  a first display;
  a second display overlaid on the first display and switchable between a transmissive state in which incident light is allowed to be transmitted and a reflective state in which incident light is allowed to be reflected; and
  a storage configured to store therein a notification method determining condition for determining whether to provide the notification of the interrupt event by using the first display or provide the notification of the interrupt event by using the second display,
  the control program comprising, upon occurrence of the interrupt event, providing the notification of the interrupt event by using the first display or providing the notification of the interrupt event by using the second display, according to the notification method determining condition, wherein
  the storage is further configured to store therein, as the notification method determining condition, a condition for providing the notification according to a result of determination whether the first display is in a displayed state, and
  the control program further comprising:
    upon the occurrence of the interrupt event, determining whether the first display is in the displayed state;
    when the result of the determination indicates that the first display is in the displayed state, then providing the notification of the interrupt event by using the first display, according to the notification method determining condition; and
    when the result of the determination indicates that the first display is not in the displayed state, then providing the notification of the interrupt event by using the second display, according to the notification method determining condition.

* * * * *